Sept. 22, 1964 R. A. EPPLER 3,149,982
METHOD OF MAKING CRYSTALLINE MICA BODIES AND PRODUCTS
Filed March 19, 1962
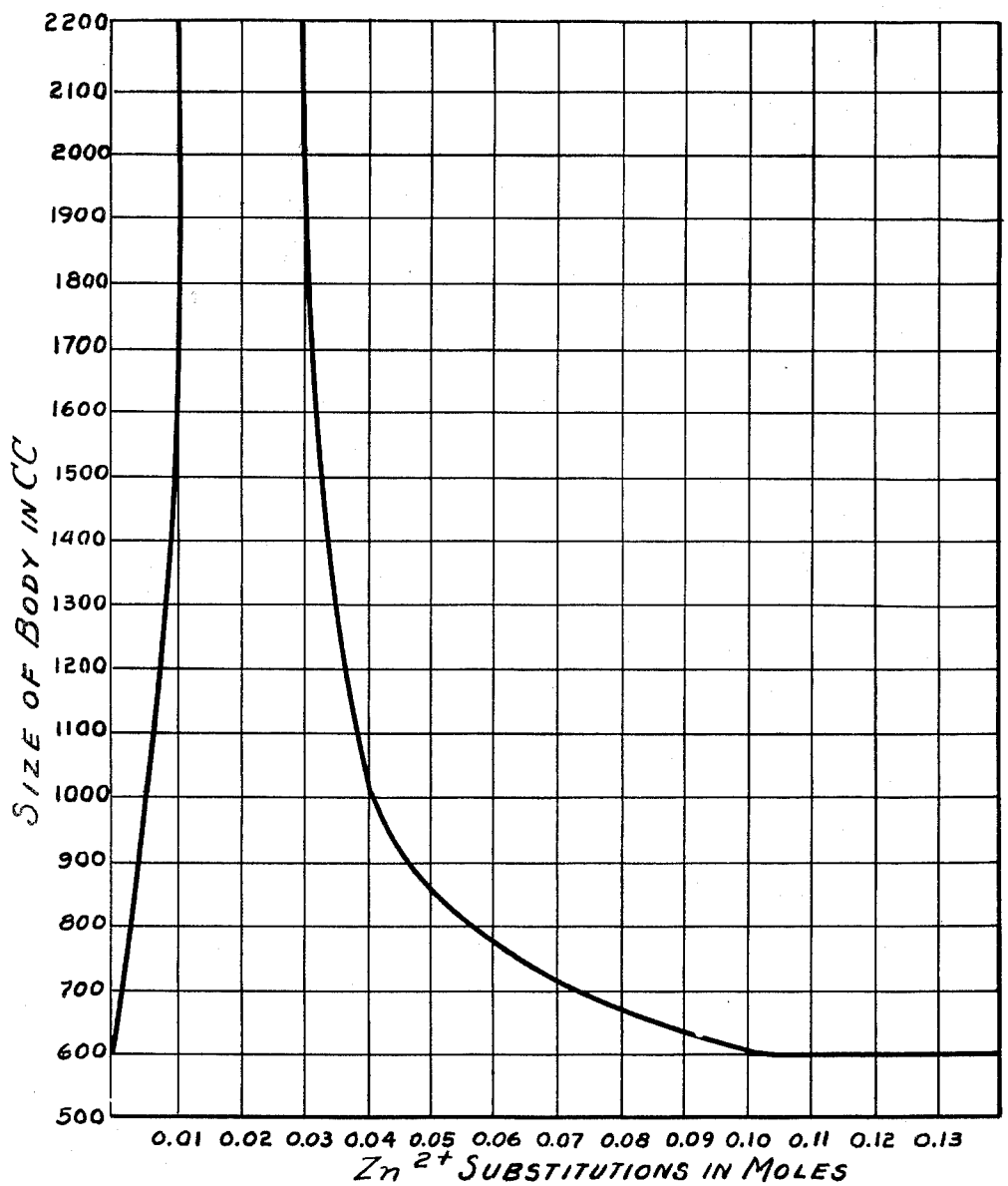
INVENTOR.
RICHARD A. EPPLER
BY
Clarence R Patty Jr.
ATTORNEY 3,149,982
METHOD OF MAKING CRYSTALLINE MICA
BODIES AND PRODUCTS
Richard A. Eppler, Corning, N.Y., assignor to Corning Glass Works, Corning, N.Y., a corporation of New York
Filed Mar. 19, 1962, Ser. No. 180,777
18 Claims. (Cl. 106—39)

This invention relates to the manufacture of synthetic mica. More particularly, this invention relates to the manufacture of large bodies of synthetic fluorophlogopite.

In the patent application of Eppler, MacDowell, and Stetler, Serial No. 180,878, filed concurrently herewith, of which the present applicant is a co-inventor, is described a novel method of rapidly producing shapes of synthetic fluorophlogopite which have outstanding electrical and machining properties. This method comprises melting a batch in which the ingredients are balanced to stoichiometrically yield at least about 90 weight percent of a fluorophlogopite composition with about 0.2 to 10.0 weight percent chromium oxide. The melt is simultaneously shaped and chilled for a sufficient period, usually about 10 to 30 seconds, to cause the surface to set up but retaining the interior in the liquid state. The shape is then placed in an annealer and cooled to room temperature. The chromium oxide acts as a nucleator in initiating the crystallization of fluorophlogopite within the shape. This method then, resulted from the discovery that where compositions of fluorophlogopite, but containing a minor amount of chromium oxide as a nucleating agent, are melted, a dense crystalline body can be obtained by direct casting. The method was much more rapid in operation than the commercially-practiced, slow, tedious growth of crystals from a liquid state which then requires further processing before being useable practically. This method also produces shapes free of surface imperfections such as were frequently encountered in the product of Klingsberg, Serial No. 53,863, wherein a glass of a fluorophlogopite composition is given a critical heat treatment in order to produce a semi-crystalline body.

Nevertheless, as more use was made of this new process and more applications for the use of the finished product were suggested, certain forming problems were encountered. The original work involved the use of small bodies, on the order of 1 inch square by ¼ inch thick, and the immediate commercial use was small electrical components. Here the described casting method gave excellent results. However, when much larger pieces were cast for use as electrical or heat insulators, the presence of internal voids or surface pits and protrusions was often noted.

The principal object of my invention is to provide a method for producing large bodies of a fluorophlogopite that are free of surface pits and protrusions and internal voids which utilizes the above-described direct casting process of Eppler, MacDowell, and Stetler, Serial No. 180,878.

In a fusion casting operation of the process described in the aforementioned application filed concurrently herewith, a fixed amount of melt is poured into a mold and allowed to solidify. Since the volume of the mold is fixed and since crystallization occurs first on the mold-melt interface, any difference between the density of the melt and that of the body crystallized therefrom results in imperfections in the interior or on the surface of the body. Where the density of the melt is less than that of the solid, large casting voids result in the interior of the bodies because there is insufficient melt to complete the body. Conversely, if the melt is more dense than the solid, then an explosion will result from expulsion of the excess fluid material leaving a surface having pits and bulges therein.

Therefore, increasing the size of the cast blocks requires decreasing the differences between the liquid and solid densities. I have discovered that the spacing between the individual fluorophlogopite crystals in the crystalline body can be adjusted so it is just sufficient to absorb the volume difference between the liquid and solid phases, thereby permitting the casting of large shapes.

A general formula for phlogopite isomorphs can be written:

$$X_{.5-1}Y_3Z_4O_{10}F_2$$

In this formula, X is normally potassium but it can be any of the large ($r>1.00$) singly or doubly charged positive ions, e.g., $Na^+$, $Ag^+$, and $Ca^{2+}$. Y represents a number of moderate sized ($0.60<r<0.90$) doubly or more highly charged positive ions, e.g., $Cu^{2+}$, $Sn^{4+}$, $Zn^{2+}$, $Mo^{6+}$, $Mn^{4+}$, $Co^{2+}$, $Ti^{4+}$, $Zr^{4+}$, and $Ni^{2+}$, although, of course, magnesium is generally present either alone or in combination with these other ions. Z is a small ($r<0.60$) highly charged positive ion. In most instances, it is aluminum and silicon in a ratio of 1.3 but boron may also be utilized in this position. An excellent article dealing with isomorphism in phlogopite structures is Shell, H. R., Effect of Ismorphous Substitutions on Properties of Fluormica Ceramics, Bu. Mines Rept. Inv. 5667, 1960. Table III records a series of experiments where increasingly larger shapes of a composition approximating the stoichiometric formula of fluorophlogopite, ($KMg_3AlSi_3O_{10}F_2$), were cast. The batches were dry ball milled for 24 hours prior to melting to aid in producing a homogeneous melt. The batches were then transferred to platinum crucibles and melted therein for six hours at 1450° C. (about 100° C. above the liquidus temperature of fluorophlogopite). The melts were then poured into steel molds, preheated to about 150° C., and a steel plate lowered into contact with the top surface of the melt. The melt was left therein for about 30 seconds to chill the outside surface, causing it to set up but leaving the interior fluid. The shapes were then placed in an annealer maintained at about 600° C. and annealed for about 0.5 hour. The annealing point of these bodies is about 600° C. Higher annealing temperatures, up to about the softening point, and longer annealing times than 0.5 hour may be used, if desired, but to no particular advantage.

The components recorded in Table I are stated in parts by weight. It will be understood, of course, that the batches may be composed of any materials, either oxides or other compounds, which, on being melted together, are converted to the desired oxide compositions in the desired proportions. Table II records the composition of the example calculated from its batch to the oxide basis in weight percent exclusive of impurities which may be present in the batch materials.

In the following compositions, as in all siliceous compositions containing fluorine, it is not known with what cation or cations the fluorine is combined. In accordance with conventional analytical practice, the fluorine is here computed as F and the total percentage of the various constituents is greater than 100. In order to arrive at a total of 100% it is customary to deduct the oxygen equivalent of fluorine, known to analysts as the percentage of fluorine divided by the combining weight of fluorine 19, and multiplied by the combining weight of oxygen, 8, or in brief, the percentage of fluorine multiplied by the factor 0.421.

*Table I*

| | |
|---|---|
| Potassium silicofluoride | 187.9 |
| Magnesia | 286.9 |
| Calcined alumina | 120.0 |
| Sand | 377.1 |
| Potassium carbonate | 33.0 |
| Potassium nitrate | 21.5 |
| Ammonium dichromate | 6.1 |

Table II

| | |
|---|---|
| $K_2O$ | 11.01 |
| $MgO$ | 28.45 |
| $Al_2O_3$ | 11.99 |
| $SiO_2$ | 42.39 |
| F | 9.79 |
| $Cr_2O_3$ | 0.48 |

Table III

| Dimensions | Volume, cc. | Results |
|---|---|---|
| 4" x 4" x 1" | 262 | No voids or explosions. |
| 4" x 4" x 1½" | 393 | Do. |
| 4" x 4" x 2" | 524 | Do. |
| 4" x 4" x 2½" | 655 | Very slight bulge on top surface. |
| 4" x 4" x 3" | 786 | Do. |
| 4" x 4" x 4" | 1,050 | Slight bulge on top surface. |
| 4" x 4" x 5" | 1,311 | Do. |
| 12" x 12" x 1" | 2,360 | Exploded. |

From Table III it can readily be seen that shapes somewhat over 32 cubic inches or about 600 cc. can be made from a fluorophlogopite composition by this method having no internal or external flaws. However, truly sound articles cannot be manufactured in larger sizes. This is the problem which was met when large blocks and shapes were attempted for heat and electrical insulators.

In a study of isomorphous substitution in the mica structure, I observed that the intercrystalline packing, and hence the bulk density of the solid, is very sensitive to substitutions in the "Y" cationic sites of the phlogopite structure. In particular, substitutions of cupric copper, zinc, stannic tin, titanium, zirconium, manganese, and molybdenum ions produce a tighter intercrystalline packing, with consequent lower porosity. This led me to attempt the development of a better fluid-solid density match by means of small additions of the above ions to the basic fluorophlogopite formula.

Accordingly, a series of melts was prepared wherein small mole for mole substitutions of these ions for magnesium ions were made. Table IV lists the series in which zinc ions were substituted.

Table IV

| Mica simulated | Weight percent |
|---|---|
| (1) $KMg_{2.9975}Zn_{0.0025}AlSi_3O_{10}F_2$ | $K_2O$, 11.00. $MgO$, 28.44. $Al_2O_3$, 11.98. $SiO_2$, 42.71. $ZnO$, .05. F, 9.79. $Cr_2O_3$, .48. |
| (2) $KMg_{2.995}Zn_{0.005}AlSi_3O_{10}F_2$ | $K_2O$, 10.99. $MgO$, 28.43. $Al_2O_3$, 11.97. $SiO_2$, 42.69. $ZnO$, .09. F, 9.78. $Cr_2O_3$, .48. |
| (3) $KMg_{2.99}Zn_{0.01}AlSi_3O_{10}F_2$ | $K_2O$, 10.98. $MgO$, 28.41. $Al_2O_3$, 11.96. $SiO_2$, 42.67. $ZnO$, .19. F, 9.77. $Cr_2O_3$, .48. |
| (4) $KMg_{2.98}Zn_{0.02}AlSi_3O_{10}F_2$ | $K_2O$, 10.95. $MgO$, 28.36. $Al_2O_3$, 11.93. $SiO_2$, 42.61. $ZnO$, .38. F, 9.74. $Cr_2O_3$, .48. |
| (5) $KMg_{2.96}Zn_{0.04}AlSi_3O_{10}F_2$ | $K_2O$, 10.90. $MgO$, 28.24. $Al_2O_3$, 11.89. $SiO_2$, 42.48. $ZnO$, .75. F, 9.70. $Cr_2O_3$, .48. |
| (6) $KMg_{2.92}Zn_{0.08}AlSi_3O_{10}F_2$ | $K_2O$, 10.79. $MgO$, 28.04. $Al_2O_3$, 11.77. $SiO_2$, 42.40. $ZnO$, 1.50. F, 9.60. $Cr_2O_3$, .48. |

Table V records the results of casting shapes of similar dimensions as those recorded in Table III.

Table V

| Mica simulated | Dimensions | Volume, cc. | Results |
|---|---|---|---|
| $KMg_{2.9975}Zn_{0.0025}AlSi_3O_{10}F_2$ | 4" x 4" x 2" | 524 | No voids or explosions. |
| | 4" x 4" x 3" | 786 | Do. |
| | 4" x 4" x 4" | 1,050 | Slight explosions. |
| | 12" x 12" x 1" | 2,360 | Many explosions. |
| $KMg_{2.995}Zn_{0.005}AlSi_3O_{10}F_2$ | 4" x 4" x 2" | 524 | No voids or explosions. |
| | 4" x 4" x 3" | 786 | Do. |
| | 4" x 4" x 4" | 1,050 | Slight explosions. |
| | 12" x 12" x 1" | 2,360 | Many explosions. |
| $KMg_{2.99}Zn_{0.01}AlSi_3O_{10}F_2$ | 4" x 4" x 2" | 524 | No voids or explosions. |
| | 4" x 4" x 3" | 786 | Do. |
| | 4" x 4" x 4" | 1,050 | Do. |
| | 12" x 12" x 1" | 2,360 | Do. |
| $KMg_{2.98}Zn_{0.02}AlSi_3O_{10}F_2$ | 4" x 4" x 2" | 524 | Do. |
| | 4" x 4" x 3" | 786 | Do. |
| | 4" x 4" x 4" | 1,050 | Do. |
| | 12" x 12" x 1" | 2,360 | Do. |
| $KMg_{2.96}Zn_{0.04}AlSi_3O_{10}F_2$ | 4" x 4" x 2" | 524 | Do. |
| | 4" x 4" x 3" | 786 | Do. |
| | 4" x 4" x 4" | 1,050 | Several internal voids. |
| | 12" x 12" x 1" | 2,360 | Many large internal voids. |
| $KMg_{2.92}Zn_{0.08}AlSi_3O_{10}F_2$ | 4" x 4" x 2" | 524 | No voids or explosions. |
| | 4" x 4" x 3" | 786 | Do. |
| | 4" x 4" x 4" | 1,050 | Several internal voids. |
| | 12" x 12" x 1" | 2,360 | Many large internal voids. |

This table, in which the polyvalent metal ions, $Cu^{2+}$, $Sn^{4+}$, $Ti^{4+}$, $Zr^{4+}$, $Mn^{4+}$, and $Mo^{6+}$, may replace the $Zn^{2+}$, when read in conjunction with Table III, clearly indicates the marked effect the size of the shape cast has on the quality of the casting. Where the body is quite small, i.e., less than about 600 cc., the possibility of internal voids and surface pits is virtually nil in the basic phlogopite isomorph. However, above about 600 cc. volume, sound castings cannot be made without the addition of small amounts of the aforementioned ions which are substituted in the "Y" cation sites. Table V illustrates the extreme criticality of the substitutions. An excess of a substituting ion leads to inter-crystalline packing which is so tight as to produce internal voids.

The compositional limits are a function of the volume of the sample. This is due to the fact that a composition change is expressed as a percentage of the total weight. Consequently, the larger the volume of the sample the larger in weight is the effect of a given compositional change.

Broadly, my invention provides a means for producing internally and externally sound large shapes containing a fluorophlogopite crystallization by substituting the aforementioned cations in the "Y" sites of the fluorophlogopite structure. Based upon the above mentioned experiments, the following compositional tolerances are believed to be critical:

(a) Where a shape has a volume over about 600 cc. but less than about 1000 cc., substitutions up to about 0.1 mole will be beneficial.

(b) Where a shape has a volume over about 1000 cc. but less than about 2000 cc., substitutions of more than 0.005 mole but less than 0.04 mole will aid in forming sound castings.

(c) Where a shape has a volume in excess of about 2000 cc. substitutions of from about 0.01 mole to about 0.03 mole are suitable.

The accompanying drawing in a graphic representation of the criticality of the amounts of $Zn^{2+}$ substituted for the $Mg^{2+}$ of the fluorophlogopite when the size of the body is increased. Thus, at a volume less than about 600 cc., bodies possessing no internal or external defects can be obtained with additions varying from none to as complete isomorphous substitution as is possible with $Zn^{2+}$. However, as can be seen readily from the area lying between the two curves of the drawing, where the volume exceeds about 600 cc. sound bodies can be made only within the narrow limits of the invention.

What is claimed is:

1. The method of producing substantially crystalline bodies greater than about 600 cc. but less than about 1000 cc. in volume of synthetic fluorophlogopite mica having excellent electrical and machining properties and having no internal voids or surface defects comprising melting a batch containing the constituents of fluorophlogopite mica, having the formula $KMg_3AlSi_3O_{10}F_2$, said constituents being present in such proportions that said melt is stoichiometrically equivalent to at least about 90% by weight fluorophlogopite, about 0.2–10.0% by weight of chromium oxide as a nucleating agent, and at least one polyvalent metal ion of the group consisting of $Cu^{2+}$, $Sn^{4+}$, $Ti^{4+}$, $Zr^{4+}$, $Mn^{4+}$, $Zn^{2+}$, and $Mo^{6+}$ which is substituted for the magnesium ion of the fluorophlogopite on a mole for mole basis, in an amount from 0.005–0.1 total mole, passing the molten batch to forming means, the surface of which is heat-conductive, thereby simultaneously forming the molten batch into the desired shape and rapidly chilling the surface of said shape to a temperature at least below the softening point of the melt, maintaining thereat for about 10 to 60 seconds to form a glass surface layer thereon, but retaining the interior in the molten state, and thereafter immediately removing said shape from the forming means and annealing said shape to cause fluorophlogopite mica crystals to grow perpendicularly from the surface layer inward.

2. The method according to claim 1 wherein the amount of chromium oxide present is about 0.5 weight percent.

3. The method according to claim 1 wherein the polyvalent metal ion is $Zn^{2+}$.

4. A substantially crystalline body free of internal voids or surface defects having a volume greater than about 600 cc. but less than 1000 cc. consisting essentially of at least about 90% by weight of fluorophlogopite, having the formula $KMg_3AlSi_3O_{10}F_2$, nucleated with about 0.2–10.0% by weight of chromium oxide and at least one polyvalent metal ion of the group consisting of $Cu^{2+}$, $Sn^{4+}$, $Ti^{4+}$, $Zr^{4+}$, $Mn^{4+}$, $Zn^{2+}$, and $Mo^{6+}$ which is substituted for the magnesium ion of the fluorophlogopite on a mole for mole basis, in an amount from 0.005 to 0.1 total moles.

5. A substantially crystalline body according to claim 4 wherein the amount of chromium oxide present is about 0.5% by weight.

6. A substantially crystalline body according to claim 4 wherein the polyvalvent metal ion is $Zn^{2+}$.

7. The method of producing substantially crystalline bodies greater than about 1000 cc. but less than about 2000 cc. in volume of synthetic fluorophlogopite mica having excellent electrical and machining properties and having no internal voids or surface defects comprising melting a batch containing the constituents of fluorophlogopite mica having the formula, $KMg_3AlSi_3O_{10}F_2$, said constituents being present in such proportions that said melt is stoichiometrically equivalent to at least about 90% by weight fluorophlogopite, about 0.2–10% by weight of chromium oxide as a nucleating agent, and at least one polyvalent metal ion of the group consisting of $Cu^{2+}$, $Sn^{4+}$, $Ti^{4+}$, $Zr^{4+}$, $Mn^{4+}$, $Zn^{2+}$, and $Mo^{6+}$ which is substituted for the magnesium ion of the fluorophlogopite on a mole for mole basis, in an amount greater than 0.005 but less than 0.01 mole, passing the molten batch to forming means, the surface of which is heat-conductive, thereby simultaneously forming the molten batch into the desired shape and rapidly chilling the surface of said shape to a temperature at least below the softening point of the melt, maintaining thereat for about 10–60 seconds to form a glass surface layer thereon but retaining the interior in the molten state, and thereafter immediately removing said shape from the forming means and annealing said shape to cause fluorophlogopite mica crystals to grow perpendicularly from the surface layer inward.

8. The method according to claim 7 wherein the amount of chromium oxide present is about 0.5 weight percent.

9. The method according to claim 7 wherein the polyvalent metal ion is $Zn^{2+}$.

10. The method of producing substantially crystalline bodies greater than about 2000 cc. in volume of synthetic fluorophlogopite mica having excellent electrical and machining properties and having no internal voids or surface defects comprising melting a batch containing the constituents of fluorophlogopite mica having the formula, $KMg_3AlSi_3O_{10}F_2$, said constituents being present in such proportions that said melt is stoichiometrically equivalent to at least about 90% by weight fluorophlogopite, about 0.2–10% by weight of chromium oxide as a nucleating agent, and at least one polyvalent metal ion of the group consisting of $Cu^{2+}$, $Sn^{4+}$, $Ti^{4+}$, $Zr^{4+}$, $Mn^{4+}$, $Zn^{2+}$, and $Mo^{6+}$ which is substituted for the magnesium ion of the fluorophlogopite on a mole for mole basis, in an amount greater than 0.01 but less than 0.03 mole, passing the molten batch to forming means, the surface of which is heat-conductive, thereby simultaneously forming the molten batch into the desired shape and rapidly chilling the surface of said shape to a temperature at least below the softening point of the melt, maintaining thereat for about 10–60 seconds to form a glass surface layer thereon but retaining the interior in the molten state, and thereafter immediately removing said shape from the forming means and annealing said shape to cause fluorophlogopite mica crystals to grow perpendicularly from the surface layer inward.

11. The method according to claim 10 wherein the amount of chromium oxide present is about 0.5 weight percent.

12. The method according to claim 10 wherein the polyvalent metal ion is $Zn^{2+}$.

13. A substantially crystalline body free of internal voids and surface defects having a volume greater than about 1000 cc. but less than about 2000 cc. consisting essentially of at least about 90% by weight of fluorophlogopite having the formula, $KMg_3AlSi_3O_{10}F_2$, nucleated with about 0.2–10% by weight of chromium oxide, and at least one polyvalent metal ion of the group consisting of $Cu^{2+}$, $Sn^{4+}$, $Ti^{4+}$, $Zr^{4+}$, $Mn^{4+}$, $Zn^{2+}$, and $Mo^{6+}$ which is substituted for the magnesium ion of the fluorophlogopite on a mole for mole basis, in an amount greater than 0.005 but less than 0.04 total mole.

14. A substantially crystalline body according to claim 13 wherein the amount of chromium oxide present is about 0.5% by weight.

15. A substantially crystalline body according to claim 13 wherein the polyvalent metal ion is $Zn^{2+}$.

16. A substantially crystalline body free of internal voids and surface defects having a volume greater than about 2000 cc. consisting essentially of at least about 90% by weight of fluorophlogopite having the formula, $KMg_3AlSi_3O_{10}F_2$, nucleated with about 0.2–10% by weight of chromium oxide, and at least one polyvalent metal ion of the group consisting of $Cu^{2+}$, $Sn^{4+}$, $Ti^{4+}$, $Zr^{4+}$, $Mn^{4+}$, $Zn^{2+}$, and $Mo^{6+}$ which is substituted for the magnesium ion of the fluorophlogopite on a mole for mole basis, in an amount greater than about 0.01 but less than about 0.03 total mole.

17. A substantially crystalline body according to claim 16 wherein the amount of chromium oxide present is about 0.5% by weight.

18. A substantially crystalline body according to claim 16 wherein the polyvalent metal ion is $Zn^{2+}$.

References Cited in the file of this patent

FOREIGN PATENTS 1,009,135     Germany _____ Feb. 9, 1961

OTHER REFERENCES

BuMines Report of Investigation 5337, "Synthetic Mica," Dept. of Interior, June 1957 (pages 35, 59, 60, 73 and 74).